Nov. 19, 1935.    H. W. WEINHART    2,021,276
SPRING WINDING MACHINE
Filed April 4, 1933
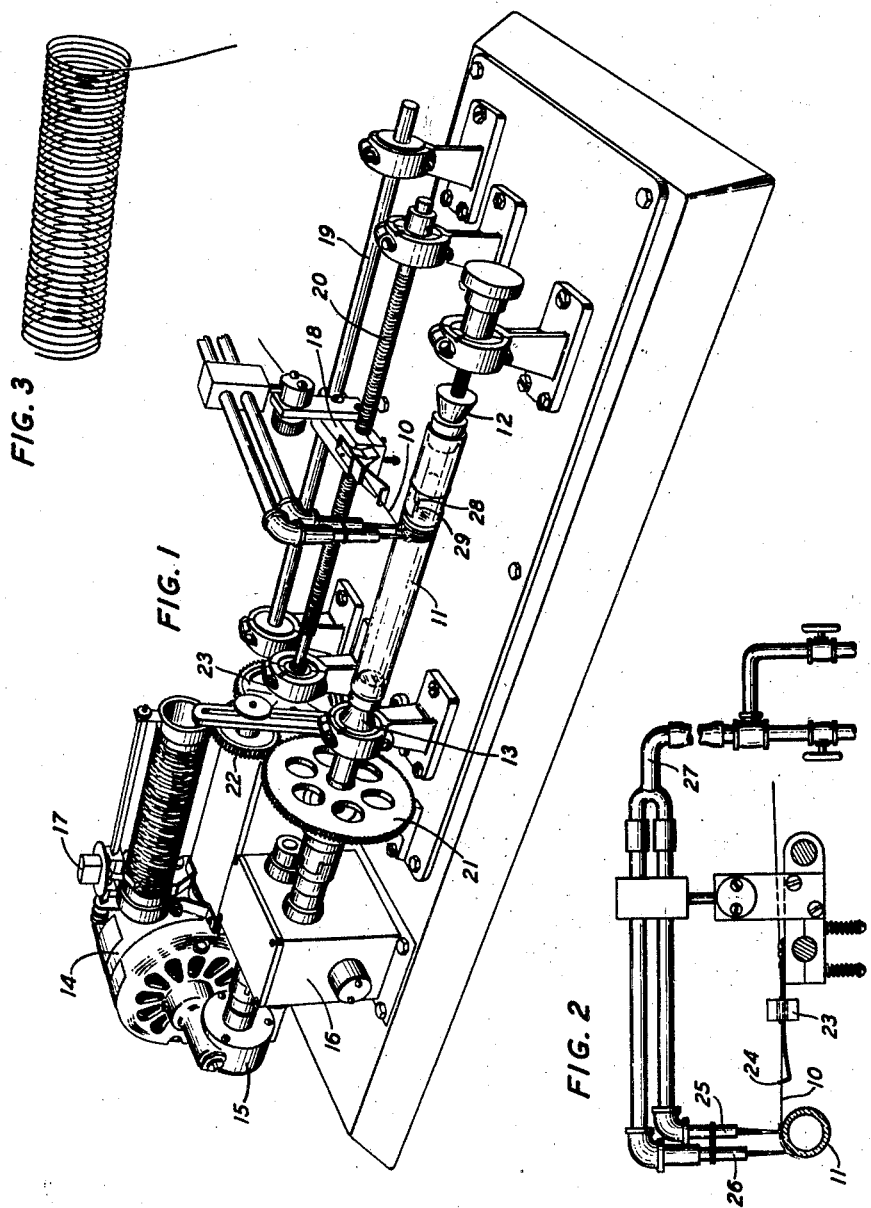
INVENTOR
H. W. WEINHART
BY
ATTORNEY Patented Nov. 19, 1935

2,021,276

UNITED STATES PATENT OFFICE 2,021,276

SPRING WINDING MACHINE

Howard W. Weinhart, Elizabeth, N. J., assignor to Bell Telephone Laboratories, Incorporated, New York, N. Y., a corporation of New York Application April 4, 1933, Serial No. 664,290

4 Claims. (Cl. 49—7)

This invention relates to machines for winding springs and particularly to machines for winding springs of vitreous silicon oxide.

The properties of vitreous silica make it an ideal material for springs used in many laboratory applications. The chemical inactivity, high melting point and freedom from cold flow make these springs particularly suitable for precision measurements of small forces and small changes in weight. Due to the fragile nature of the silica and its critical melting temperature, it has been difficult to make satisfactory springs of this material. Usually the springs are of irregular shape so that their characteristics can not be determined beforehand.

It is an object of this invention to provide a machine that will automatically wind uniform and regular springs of vitreous silica.

An important feature of this machine is the position of the heating means relative to the fiber and mandrel whereby the fiber is softened just as it contacts the mandrel to enable it to take the shape of the mandrel, and is then maintained in a heated condition for a fraction of a turn to insure a complete conformance to the contour of the mandrel and also to anneal the silica.

The accompanying drawing shows a preferred form of the machine:

Fig. 1 is a perspective of the machine with the mandrel and heating means in position;

Fig. 2 is a side elevation of the machine in section through the mandrel showing the points of application of heat; and Fig. 3 is a view of a finished spring.

A silica fiber such as is used in the formation of these springs may be made by heating the mid-portion of a clear silica rod until it becomes soft and then quickly pulling the ends apart. The diameter of the fiber is determined by the size of the rod and the speed with which it is drawn.

Referring now to Fig. 1, the silica fiber is shown at 10 being wound on a mandrel 11 which rotates between a dead center 12 and a live center 13 of the machine. So closely does the fiber follow the contour of the mandrel that it has been found necessary to make the mandrel of silica. Other materials, such as carbon, were found to be too rough and would not permit the spring to be slipped off easily and undamaged.

The mandrel 11 is driven by a variable speed electric motor 14 through a 20 to 1 worm reduction gear 15, the output of which is still further reduced by a 50 to 1 reduction box 16, so that the final speed of the mandrel is about 1.5 R. P. M. The variation in motor speed is secured by means of a field rheostat 17.

The silica fiber 10 is fed to the mandrel 11 from a carriage 18, supported on a slide rod 19 and lead screw 20 by which it is driven laterally. The lead screw 20 is positively driven from the mandrel drive through gear 21, an adjustable idler 22, and gear 23. The last mentioned gear is removably secured to the lead screw 20 and may be replaced by gears with a greater or lesser number of teeth to allow springs of different pitches to be formed.

The fiber and carriage are shown to better advantage in Fig. 2 and will be described with reference to that figure.

A slight tension is introduced into the fiber 10 by passing it between a spring clip 23 and a guide 24, the end of which is notched and turned up to the proper height relative to the mandrel 11 to cause the fiber to contact the mandrel at a predetermined point.

On the same carriage 18 are mounted the burners 25 and 26 by which the fiber is heated. Burner 25 is placed so that its flame strikes the silica exactly where it comes in contact with the mandrel, and the flame of burner 26 is directed on the fiber and on the mandrel opposite the feeding side of the mandrel. The two flames combined are in this way located close enough together to heat the mandrel uniformly over about one-third of its circumference. Heating over this large area prevents kinking and results in a uniform roundness of the spiral as well as providing sufficient annealing to make further annealing unnecessary.

The flames are a mixture of city gas and air supplied to the two burners through a connector 27. The flames have been found to give the best results when adjusted to strike the fiber about three millimeters beyond the cone of the flame. The temperature is important; too hot a flame softens the silica sufficiently to cause it to draw apart and a flame not hot enough leaves the fiber too cold to bend permanently.

To start the winding of the fiber it is necessary to anchor one end of it to the mandrel. This may be done by forming a hook 28 from a stiff wire and then wrapping the wire around the mandrel and twisting its ends so that enough friction is developed between the wire and mandrel to prevent it from moving relative to the mandrel. A similar hook 29 is formed in the end of the fiber 10 and engaged with hook 28. The fiber may be run along the axis of the mandrel for a short space and then bent at right angles and wound around the mandrel.

Once the machine is started and the flames properly adjusted the winding of the spring is entirely automatic. After the spring is completed it is unhooked and slipped off the mandrel. The ends of the spring may be shaped in any desired manner depending upon the use to which it is to be put. Such a finished spring is shown in Fig. 3.

It is understood that the foregoing description is merely illustrative of the invention and that variations may be introduced therein without departing from the scope of the invention as defined in the appended claims.

What is claimed is:

1. Apparatus for forming a helix from a fiber of vitreous silicon oxide comprising a mandrel of silica upon which the helix is formed, means for rotating the mandrel, a carriage, means for moving the carriage parallel to the axis of the mandrel, means on the carriage for feeding the fiber to the mandrel and means for heating the fiber at the mandrel to enable it to become permanently bent.

2. Apparatus for forming a helix from a fiber of vitreous silicon oxide comprising a smooth mandrel, means for rotating the mandrel uniformly, a carriage means for moving the carriage parallel to the axis of the mandrel and in synchronism therewith, means on the carriage for feeding the fiber to the mandrel, and means for heating the fiber comprising a plurality of gas burners secured to the carriage and adapted to heat the fiber at the point of contact with the mandrel and for a fraction of a turn thereafter whereby the fiber is annealed and permanently formed.

3. Apparatus for forming a helix from a fiber of vitreous silicon oxide comprising a cylindrical silica mandrel on which the helix is formed, means for rotating the mandrel uniformly, a carriage, means for moving the carriage parallel to the axis of the mandrel and in synchronism therewith, means on the carriage for feeding the fiber to the mandrel and means for heating the fiber comprising a pair of gas burners secured to the carriage one of which is adapted to heat the fiber at the point of contact with the mandrel and the other is adapted to keep the fiber hot for one-third of the circumference whereby the fiber is permanently bent and annealed.

4. Apparatus for forming a helix from a thin fiber of vitreous silicon oxide comprising a perfectly smooth mandrel on which the heliex is formed, means for rotating the mandrel, a carriage, means for moving the carriage parallel to the mandrel and in synchronism therewith, means on the carriage for feeding the thin fiber to the mandrel, and means for heating the thin fiber at the point of contact with the mandrel and for less than one complete turn of the mandrel thereafter.

HOWARD W. WEINHART.